(12) United States Patent
Kuribayashi

(10) Patent No.: US 11,472,249 B2
(45) Date of Patent: *Oct. 18, 2022

(54) SUSPENSION DEVICE FOR VEHICLE

(71) Applicant: TOYOTA JIDOSHA KABUSHIKI KAISHA, Toyota (JP)

(72) Inventor: Takuya Kuribayashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,735

(22) Filed: Mar. 23, 2020

(65) Prior Publication Data

US 2020/0361268 A1 Nov. 19, 2020

(30) Foreign Application Priority Data

May 13, 2019 (JP) .............................. JP2019-090909

(51) Int. Cl.
    *B60G 15/06*     (2006.01)
    *B60G 7/00*      (2006.01)

(52) U.S. Cl.
    CPC .......... *B60G 15/063* (2013.01); *B60G 7/001* (2013.01); *B60G 2202/122* (2013.01); *B60G 2202/24* (2013.01); *B60G 2202/312* (2013.01)

(58) Field of Classification Search
    CPC .. B60G 15/062; B60G 15/063; B60G 15/068; B60G 7/001; B60G 2202/31;
    (Continued)

(56) References Cited

U.S. PATENT DOCUMENTS 4,474,363 A * 10/1984 Numazawa .......... B60G 15/063
                                                280/124.147
5,080,389 A *  1/1992 Kawano ................... B60G 3/20
                                                280/124.142
(Continued)

FOREIGN PATENT DOCUMENTS

CN      206106867 U       4/2017
CN      111923674 A  * 11/2020 ............. B60G 7/001
(Continued)

OTHER PUBLICATIONS

Mehajoub, MacPherson Strut Arrangement For Motor Vehicle Wheel, Has Single Spring Mounted Between Lower And Upper Retainers, Oct. 29, 2010, EPO, FR 2944734 A1, Machine Translation of Description (Year: 2010).*

(Continued)

*Primary Examiner* — Paul N Dickson
*Assistant Examiner* — Matthew D Lee
(74) *Attorney, Agent, or Firm* — Sughrue Mion, PLLC

(57) ABSTRACT

A suspension device for a vehicle, including a spring-absorber unit constituted by a shock absorber and a suspension spring that are formed as one unit, the shock absorber including a cylindrical housing, a piston disposed in the housing, and a piston rod that is connected at a basal portion thereof to the piston and that extends from the housing, the suspension spring being a coil spring through which the shock absorber passes, wherein one end portion of the suspension spring is capable of being supported by the housing of the shock absorber, and the other end portion of the suspension spring is capable of being supported by a distal portion the piston rod of the shock absorber while the suspension spring is receiving a tensile load.

7 Claims, 7 Drawing Sheets

(58) Field of Classification Search
CPC .......... B60G 2202/312; B60G 2202/24; B60G 2202/122; B60G 2200/144; B60G 3/20; B60G 2204/124; B60G 2204/1242; B60G 2204/12422; B60G 2204/41044
See application file for complete search history.

(56) References Cited

U.S. PATENT DOCUMENTS

| | | | |
|---|---|---|---|
| 5,238,261 | A | 8/1993 | Ogiso |
| 5,454,550 | A * | 10/1995 | Christopherson .... B60G 15/062 188/322.12 |
| 6,113,119 | A | 9/2000 | Laurent et al. |
| 6,676,145 | B2 | 1/2004 | Carlstedt et al. |
| 6,719,313 | B2 | 4/2004 | Zadok |
| 7,118,119 | B2 | 10/2006 | Amanuma |
| 7,185,902 | B1 | 3/2007 | Lloyd |
| 7,357,400 | B2 * | 4/2008 | Serra .................... B60G 7/008 280/124.134 |
| 7,784,805 | B2 | 8/2010 | Morgan |
| 7,914,025 | B2 | 3/2011 | Mayen et al. |
| 7,950,680 | B2 | 5/2011 | Christensen |
| 8,882,116 | B2 | 11/2014 | Cuttino et al. |
| 9,050,872 | B2 | 6/2015 | Seethaler et al. |
| 9,731,572 | B2 | 8/2017 | Tamura et al. |
| 9,844,992 | B2 | 12/2017 | Aldrich |
| 10,427,483 | B1 | 10/2019 | Aldrich |
| 10,780,754 | B2 | 9/2020 | Ye |
| 10,894,458 | B2 | 1/2021 | Battaglia et al. |
| 2003/0122336 | A1 * | 7/2003 | Zadok ................... B60G 11/16 280/124.106 |
| 2008/0001376 | A1 * | 1/2008 | Jeong ................... B60G 11/15 280/124.179 |
| 2008/0012262 | A1 | 1/2008 | Carabelli et al. |
| 2012/0280465 | A1 | 11/2012 | Meitinger et al. |
| 2018/0141400 | A1 | 5/2018 | Liu |
| 2020/0361266 | A1 * | 11/2020 | Kuribayashi ........ B60G 15/067 |

FOREIGN PATENT DOCUMENTS

| | | | | |
|---|---|---|---|---|
| FR | 2944734 | A1 * | 10/2010 | ............. B60G 11/16 |
| JP | 58-142109 | U | 9/1983 | |
| JP | 01056216 | A * | 3/1989 | .............. B60G 3/20 |
| JP | 9-66717 | A | 3/1997 | |
| JP | 10-338009 | A | 12/1998 | |
| JP | 2003-222176 | A | 8/2003 | |
| JP | 2005-126037 | A | 5/2005 | |
| JP | 2007-161032 | A | 6/2007 | |
| JP | 2007-230433 | A | 9/2007 | |
| JP | 2007230433 | A * | 9/2007 | |
| JP | 2008-24176 | A | 2/2008 | |
| JP | 2009-202606 | A | 9/2009 | |
| JP | 2018-083484 | A | 5/2018 | |
| WO | 2005/030509 | A1 | 4/2005 | |
| WO | 2011/050911 | A1 | 5/2011 | |

OTHER PUBLICATIONS

Mehajoub , MacPherson Strut Arrangement For Motor Vehicle Wheel, Has Single Spring Mounted Between Lower And Upper Retainers, Oct. 29, 2010, EPO, FR 2944734 A1, Machine Translation of Abstract (Year: 2010).*

Mehajoub , MacPherson Strut Arrangement For Motor Vehicle Wheel, Has Single Spring Mounted Between Lower And Upper Retainers, Oct. 29, 2010, EPO, FR 2944734 A1, Machine Translation of Description (Year: 2010) (Year: 2010).*

Mehajoub , MacPherson Strut Arrangement For Motor Vehicle Wheel, Has Single Spring Mounted Between Lower And Upper Retainers, Oct. 29, 2010, EPO, FR 2944734 A1, Machine Translation of Abstract (Year: 2010) (Year: 2010).*

U.S. Appl. No. 16/822,622, filed Mar. 18, 2020 (Kuribayashi).
Office Action dated Sep. 23, 2021 in U.S. Appl. No. 16/822,622.

* cited by examiner

L1/L2 ≒ 70%
L3/L4 ≒ 75%
RS = ΔSA/ΔSW ≒ 100%

$RS = \Delta SA / \Delta SW \leq 50\%$ $LA/L2 \fallingdotseq 20\% \leq 50\%$

SUSPENSION DEVICE FOR VEHICLE

CROSS REFERENCE TO RELATED APPLICATION

The present application claims priority to Japanese Patent Application No. 2019-090909, which was filed on May 13, 2019, the disclosure of which is herein incorporated by reference in its entirety.

BACKGROUND

Technical Field

The following disclosure relates to a suspension device installed on a vehicle.

Description of Related Art

Most of suspension devices for vehicles employ a coil spring as a suspension spring as described in Patent Document 1 (Japanese Patent Application Publication No. 2018-83484), for instance, and are configured such that a weight of a vehicle body is supported by a reaction force generated by compression of the coil spring, i.e., an elastic compressive reaction force of the coil spring.

SUMMARY

The suspension devices have been actively developed in recent years, and various types of the suspension devices are available. Some suspension devices that employ the coil spring as the suspension spring are configured such that the weight of the vehicle body does not act in a direction to compress the coil spring in a full bound state or a full rebound state, and others are configured such that the weight of the vehicle body is supported by a reaction force generated by tension of the coil spring, i.e., an elastic tensile reaction force of the coil spring. Those suspension devices may be referred to as suspension devices of coil spring tension support type. In the meantime, there is known a spring-absorber unit constructed such that a shock absorber is disposed so as to pass through the coil spring as the suspension spring and the suspension spring and the shock absorber are formed as one unit. In the thus constructed spring-absorber unit, the coil spring is supported at its opposite end portions by a cylindrical housing of the shock absorber and a distal portion of a piston rod, respectively. If the suspension device of coil spring tension support type described above can be constructed so as to include the spring-absorber unit, the suspension device offers high utility. Accordingly, one aspect of the present disclosure is directed to a suspension device for a vehicle having high utility.

In one aspect of the present disclosure, a suspension device for a vehicle includes a spring-absorber unit constituted by a shock absorber and a suspension spring that are formed as one unit, the shock absorber including a cylindrical housing, a piston disposed in the housing, and a piston rod that is connected at a basal portion thereof to the piston and that extends from the housing, the suspension spring being a coil spring through which the shock absorber passes, wherein one end portion of the suspension spring is capable of being supported by the housing of the shock absorber, and the other end portion of the suspension spring is capable of being supported by a distal portion the piston rod of the shock absorber while the suspension spring is receiving a tensile load.

According to the spring-absorber unit constructed as described above, the one end portion and the other end portion of the coil spring as the suspension spring are capable of being supported by the shock absorber while a tensile load acting on the coil spring. According to the present disclosure, the employment of the spring-absorber unit enables construction of the suspension device of coil spring tension support type having high utility.

Various Forms

The suspension device for the vehicle (hereinafter simply referred to as "suspension device" where appropriate) according to the present disclosure may be configured such that the suspension spring (hereinafter simply referred to as "spring" where appropriate) is receiving the tensile load in at least one of a full bound state and a full rebound state or may be configured such that the suspension spring is receiving the tensile load in all of the full bound state, the full rebound state, and an intermediate state between the full bound state and the full rebound state. Here, a range of a stroke movement, namely, a range of a relative movement of the vehicle body and the wheel in the up-down direction, is defined as a stroke range. In the former configuration, the spring is receiving a compressive load in a substantial part of the stroke range, and the spring is receiving the tensile load in only one of: the full bound state and a state close thereto; and the full rebound state and a state close thereto. In the latter configuration, the spring is receiving the tensile load over the entirety of the stroke range. In this respect, the full bound state means a state in which the wheel is moved upward relative to the vehicle body and located at the uppermost position in the stroke range, and the full rebound state means a state in which the wheel is moved downward relative to the vehicle body and located at the lowermost position in the stroke range.

Here, each of the one end portion of the spring supported by the housing of the shock absorber (hereinafter simply referred to as "absorber" where appropriate) and the other end portion of the spring supported by the distal portion of the piston rod of the absorber is referred to as an end portion. There will be explained specific structures for supporting the respective end portions of the spring by the absorber in the suspension device according to the present disclosure. The suspension device according to the present disclosure can employ a structure constituted by: a spring seat with which a tip or an end of the spring is held in contact and which is provided for at least one of the one end portion and the other end portion of the spring so as to be disposed on the housing of the absorber or the distal portion of the piston rod; and a nipping member that cooperates with the spring seat to nip the end portion of the spring therebetween. This structure enables the end portion of the spring to be firmly supported by the absorber while the tensile load is acting on the spring. In this structure, the nipping member may be supported by the spring seat or may be supported by the housing of the absorber or the distal portion of the piston rod. That is, the nipping member may be supported indirectly by the absorber via the spring seat or may be supported directly by the absorber.

There will be explained an employable configuration of the suspension device according to the present disclosure in which the opposite end portions of the spring are supported by the absorber while the spring is receiving the tensile load. The suspension device includes: (a) a carrier rotatably holding a wheel; (b) a lower arm and an upper arm each of which is pivotally supported at one end portion thereof by the vehicle body, the other end portion of each of the lower arm and the upper arm being connected to the carrier; (c) a rocking lever supported at one end portion thereof by the vehicle body so as to be rockable; and (d) a link one end portion of which is connected to the rocking lever and the other end portion of which is connected to one of the lower arm and the upper arm at a position between the one end portion and the other end portion of the one of the lower arm and the upper arm. Further, the absorber is pivotally supported at the one end portion thereof by the vehicle body and is connected at the other end portion thereof to the rocking lever. Owing to the employment of the configuration utilizing the rocking lever and the link, the suspension device of the present disclosure ensures a relatively large stroke ratio. The stroke ratio is a ratio of a stroke amount of the shock absorber (i.e., an amount of expansion and contraction of the shock absorber) with respect to a stroke amount of the wheel (i.e., an amount of the relative upward and downward movement of the wheel and the vehicle body).

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
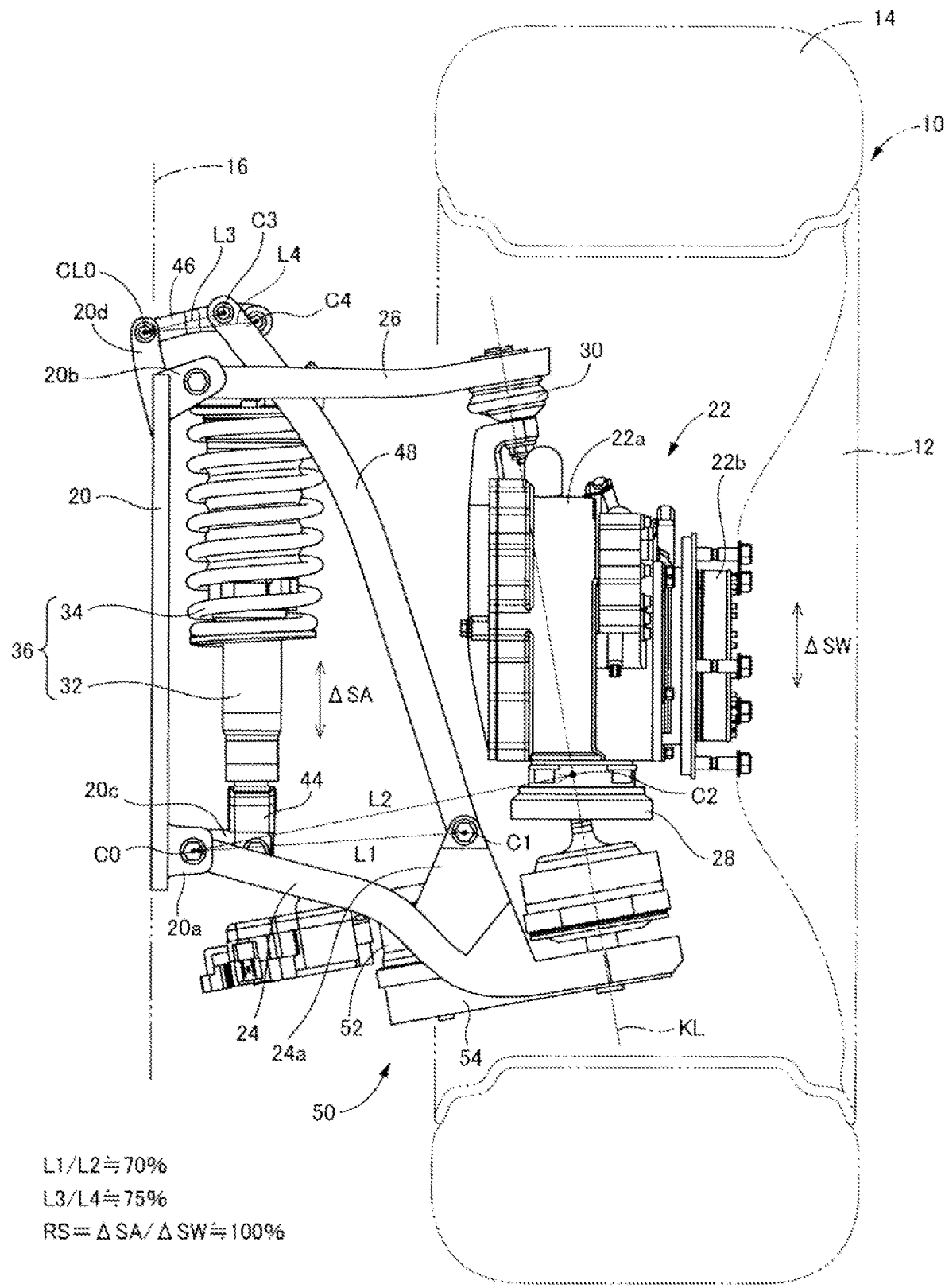
FIG. 1 is a view of a suspension device for a vehicle according to one embodiment as viewed from a front side of the vehicle.

Referring to the drawings, there will be explained in detail a suspension device for a vehicle according to one embodiment of the present disclosure. It is to be understood that the present disclosure is not limited to the details of the following embodiment but may be embodied based on the forms described in Various Forms and may be changed and modified based on the knowledge of those skilled in the art.

A. OVERALL CONFIGURATION OF SUSPENSION DEVICE FOR VEHICLE

As apparent from FIG. 1 illustrating a suspension device according to one embodiment as viewed from a front side of a vehicle, the present suspension device is a double wishbone type suspension device. The suspension device illustrated in FIG. 1 is provided for a front left wheel of the vehicle. A wheel 10 as the front left wheel is constituted by a wheel 12 and a tire 14. Roughly, the present suspension device includes: a base plate 20 as a support member detachably mounted on a body 16 of the vehicle (hereinafter referred to as "vehicle body 16" where appropriate); an in-wheel motor unit 22 (hereinafter simply referred to as "unit 22" where appropriate) as a carrier that rotatably holds the wheel 10; a lower arm 24 which is pivotally supported at a first end portion (basal portion) thereof by the base plate 20 and whose second end portion (distal portion) is connected to a lower portion of the unit 22; and an upper arm 26 which is pivotally supported at a first end portion (basal portion) thereof by the base plate 20 and whose second end portion (distal portion) is connected to an upper portion of the unit 22. The base plate 20 is configured to be attachable to and detachable from the body 16 of the vehicle.

The unit 22 includes a housing 22a, an electric motor and a speed reducer that are disposed in the housing 22a, an axle hub 22b rotatably supported by the housing 22a, etc. The housing 22a itself can be regarded as functioning as the carrier. The wheel 12 is attached to the axle hub 22b, and the electric motor functions as a rotational drive source of the axle hub 22b, namely, as a rotational drive source of the wheel 10.

Figure 2B:
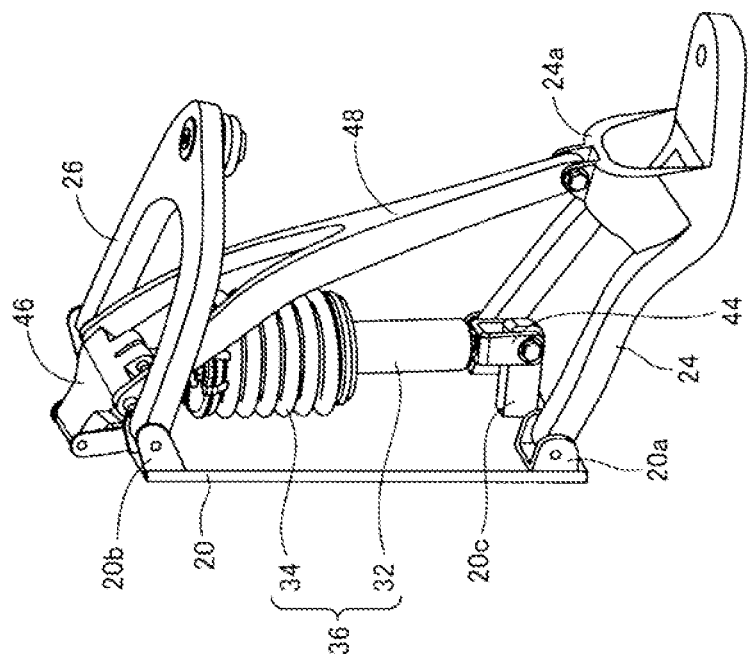
FIG. 2B is a perspective view of the suspension device according to the embodiment in a full rebound state of the vehicle.
Figure 2A:
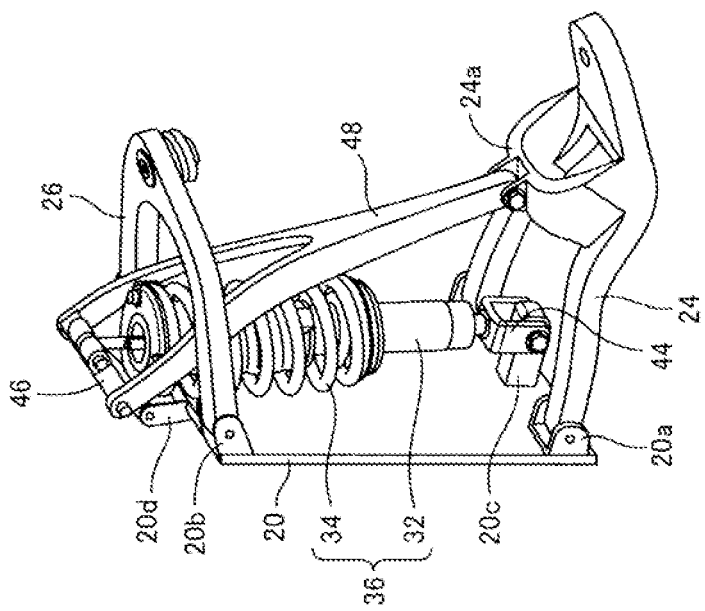
FIG. 2A is a perspective view of the suspension device according to the embodiment in a full bound state of the vehicle.

The present suspension device will be explained referring also to FIGS. 2A and 2B in which the unit 22 is not illustrated. It is noted that FIG. 2A shows the suspension device in a full bound state and FIG. 2B shows the suspension device in a full rebound state. The lower arm 24 is bifurcated at the first end portion (as one end portion), in other words, the lower arm 24 is shaped such that two arms are joined at the second end portion (as the other end portion). The first end portion of the lower arm 24 is connected, at two positions arranged in the front-rear direction of the vehicle, to respective two brackets 20a provided at a lower end portion of the base plate 20. Similarly, the upper arm 26 is bifurcated at the first end portion (as one end portion), in other words, the upper arm 26 is shaped such that two arms are joined at the second end portion (as the other end portion). The first end portion of the upper arm 26 is connected, at two positions arranged in the front-rear direction of the vehicle, to respective two brackets 20b provided at an upper end portion of the base plate 20.

The second end portion of the lower arm 24 is connected to the unit 22 through a tripod constant velocity joint 28, and the second end portion of the upper arm 26 is connected to the unit 22 through a ball joint 30. The unit 22 is pivotable about a kingpin axis KL defined by the tripod constant velocity joint 28 and the ball joint 30. That is, the wheel 10 is a steerable wheel, and the unit 22 functioning as the carrier functions also as a steering knuckle.

Figures 3A, 3B:
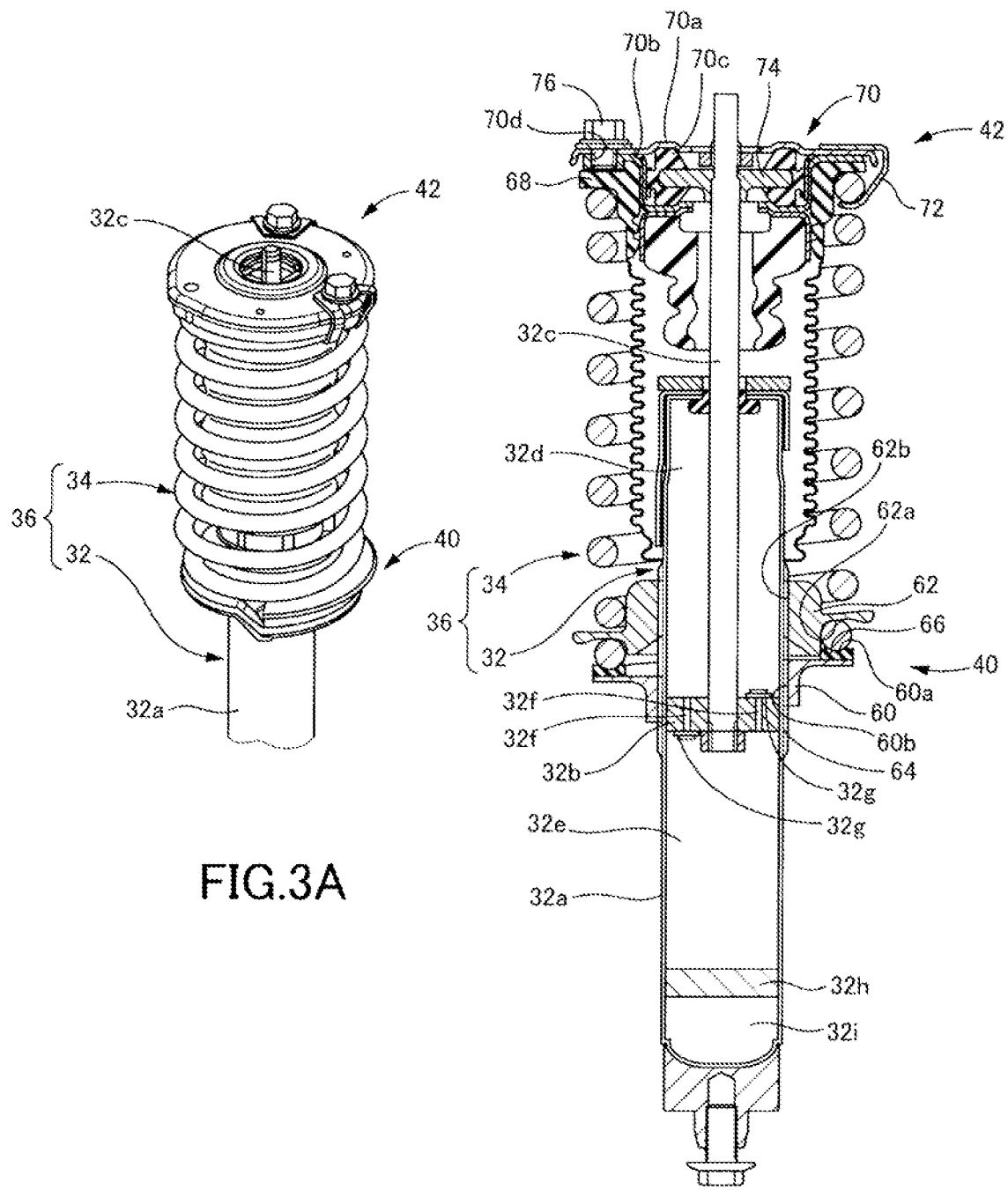
FIG. 3A is a perspective view of a spring-absorber unit of the suspension device according to the embodiment.
FIG. 3B is a cross-sectional view of the spring-absorber unit of the suspension device according to the embodiment.

The present suspension device includes a spring-absorber assembly (Assy) 36 functioning as a spring-absorber unit. Specifically, the spring-absorber assembly 36 is constituted by a hydraulic shock absorber 32 and a suspension spring 34 that are formed as one unit. The suspension spring 34 is a coil spring disposed such that the shock absorber 32 passes therethrough. Hereinafter, the spring-absorber assembly 36 will be referred to as "SA/Assy 36" where appropriate, the shock absorber 32 will be referred to as "absorber 32" where appropriate, and the suspension spring 34 will be referred to as "spring 34" where appropriate. FIG. 3A is a partly enlarged view of the SA/Assy 36.

Referring also to FIG. 3B, the absorber 32 includes a cylindrical housing 32a, a piston 32b disposed in the housing 32a, and a piston rod 32c whose basal portion (lower end portion) is connected to the piston 32b and which extends upward from the housing 32a. The piston 32b partitions an interior of the housing 32a into two fluid chambers, i.e., an upper chamber 32d and a lower chamber 32e. In conjunction with expansion and contraction of the absorber 32, a working fluid flows between the upper chamber 32d and the lower chamber 32e via communication passages 32f formed through the piston 32b. Valves 32g provided on the piston 32b give a resistance to the flow of the working fluid, and the absorber 32 generates a damping force with respect to expansion and contraction owing to the resistance. While not explained in detail, the housing 32a is a double-tube, and the working fluid is stored in an inter-tube chamber formed between the two tubes. A variation in volume of a buffer chamber 32i provided under a free piston 32h and communicating with the inter-tube chamber is allowed, whereby a variation in total volume of the upper chamber 32d and the lower chamber 32e that is caused by expansion and contraction of the absorber 32 is allowed.

A first end portion (lower end portion) of the spring 34 is supported by the housing 32a of the absorber 32, and a second end portion (upper end portion) of the spring 34 is supported by a distal portion (upper end portion) of the piston rod 32c. The spring 34 expands and contracts in conjunction with expansion and contraction of the absorber 32. There will be later explained in detail a first-end supporting structure 40 for supporting the first end portion (as one end portion) of the spring 34 and a second-end supporting structure 42 for supporting the second end portion (as the other end portion) of the spring 34. A first end portion (as one end portion) of the absorber 32 is connected to a bracket 20c provided at the lower end portion of the base plate 20 through a clevis 44. That is, the absorber 32 is pivotally supported at the first end portion (lower end portion) thereof by the base plate 20.

Figure 4:
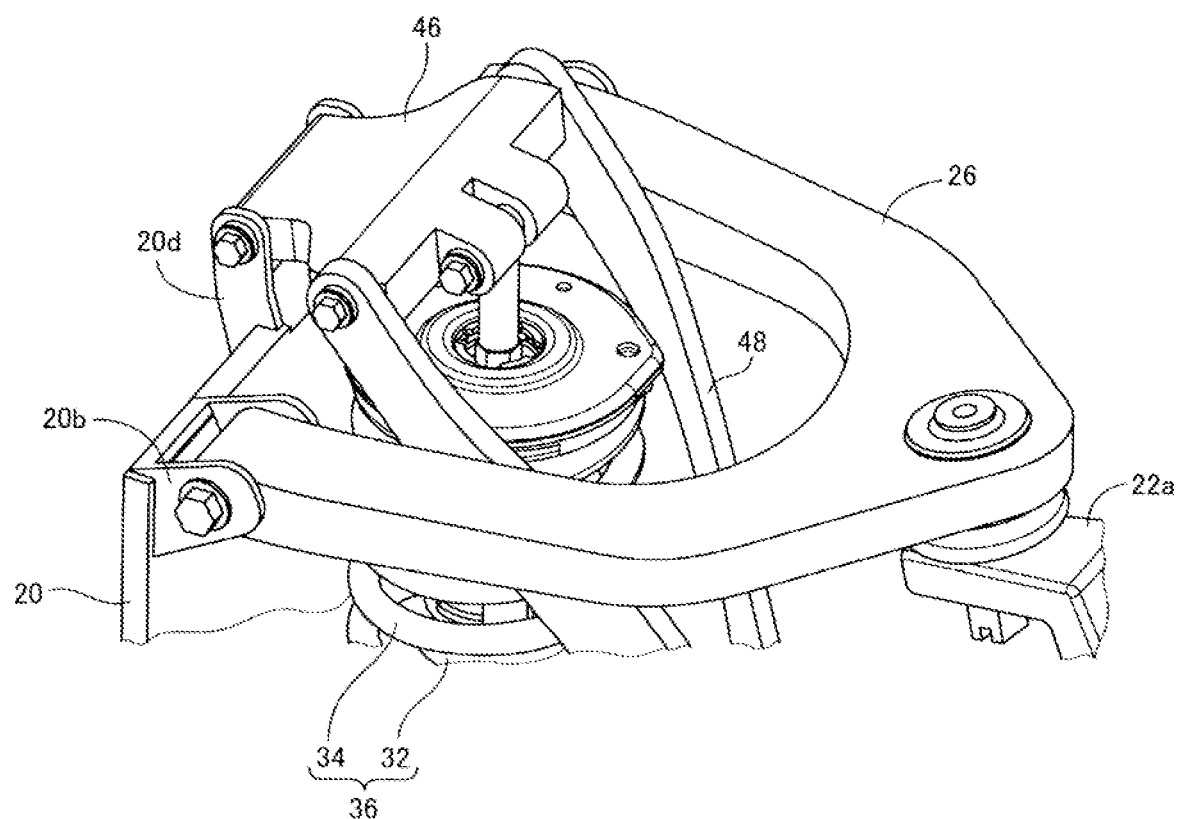
FIG. 4 is a perspective view illustrating connection among a rocking lever, a shock absorber, and a link in the suspension device according to the embodiment.

The suspension device further includes a rocking lever 46 and a link 48. Referring also to FIG. 4, the rocking lever 46 and the link 48 will be explained. A bracket 20d is provided at the upper end portion of the base plate 20. The rocking lever 46 is pivotally connected at a first end portion (basal portion) thereof to the bracket 20d. In other words, the rocking lever 46 is supported at the first end portion thereof by the base plate 20 so as to be rockable. To a second end portion (distal portion) of the rocking lever 46, a second end portion (upper end portion) of the absorber 32, namely, the distal portion of the piston rod 32c of the absorber 32, is pivotally connected.

The link 48 is bifurcated at a first end portion (upper end portion) thereof. In other words, the link 48 is shaped such that two arms are joined at a second end portion (lower end portion) thereof. The first end portion and the second end portion of the link 48 correspond to one end portion and the other end portion of the link 48, respectively. The link 48 is disposed so as to pass between the two arms of the upper arm 26. The first end portion of the link 48 is pivotally connected to the rocking lever 46 at a position between the first end portion (as one end portion) and the second end portion of the rocking lever 46. In other words, the absorber 32 is connected to the rocking lever 46 at a position that is farther from the first end portion of the rocking lever 46 than a position at which the first end portion of the link 48 is connected to the rocking lever 46. In other words, a distance between the first end portion of the rocking lever 46 and the position at which the absorber 32 is connected to the rocking lever 46 is larger than a distance between the first end portion of the rocking lever 46 and the position at which the first end portion of the link 48 is connected to the rocking lever 46. The second end portion of the link 48 is connected between the first end portion and the second end portion of the lower arm 24, namely, connected to a bracket 24a provided on the lower arm 24, such that the link 48 and the lower arm 24 are pivotable relative to each other.

In the present suspension device, a steering device 50 is held by the lower arm 24. The steering device 50 includes the tripod constant velocity joint 28 (hereinafter abbreviated as "joint 28" where appropriate) rotatably held by the distal portion of the lower arm 24, an electric motor 52 as a drive source, and a transmission mechanism 54 for transmitting rotation of the electric motor 52 to the joint 28. Though illustration of an internal structure of the transmission mechanism 54 is omitted, the mechanism is constituted by a gear train. While not shown, the suspension device further includes an electric brake device including a disc rotor held by the wheel 12 together with the axle hub 22b and an electric brake actuator supported by the housing 22a of the unit 22 and configured to push brake pads onto the disc rotor.

As understood from the explanation above, the suspension device is configured such that the first end portion of the lower arm 24, the first end portion of the upper arm 26, the first end portion of the rocking lever 46, and the first end portion of the absorber 32 are pivotally supported by the base plate 20 attached to the vehicle body 16. It can be considered that the first end portions of the lower arm 24, the upper arm 26, the rocking lever 46, and the absorber 32 are supported by the vehicle body 16. The present suspension device includes the base plate 20 as a support member configured to be attachable to and detachable from the vehicle body 16, so that the suspension device is formed as a module. That is, the present suspension device can be regarded as a wheel holding module configured to be attached to the vehicle body 16, and the wheel holding module can be regarded as being modularized including also the steering device 50 and the brake device. The employment of such a module facilitates assembling of the vehicle.

B. CHARACTERISTIC CONFIGURATION UTILIZING ROCKING LEVER AND LINK

Figure 5:
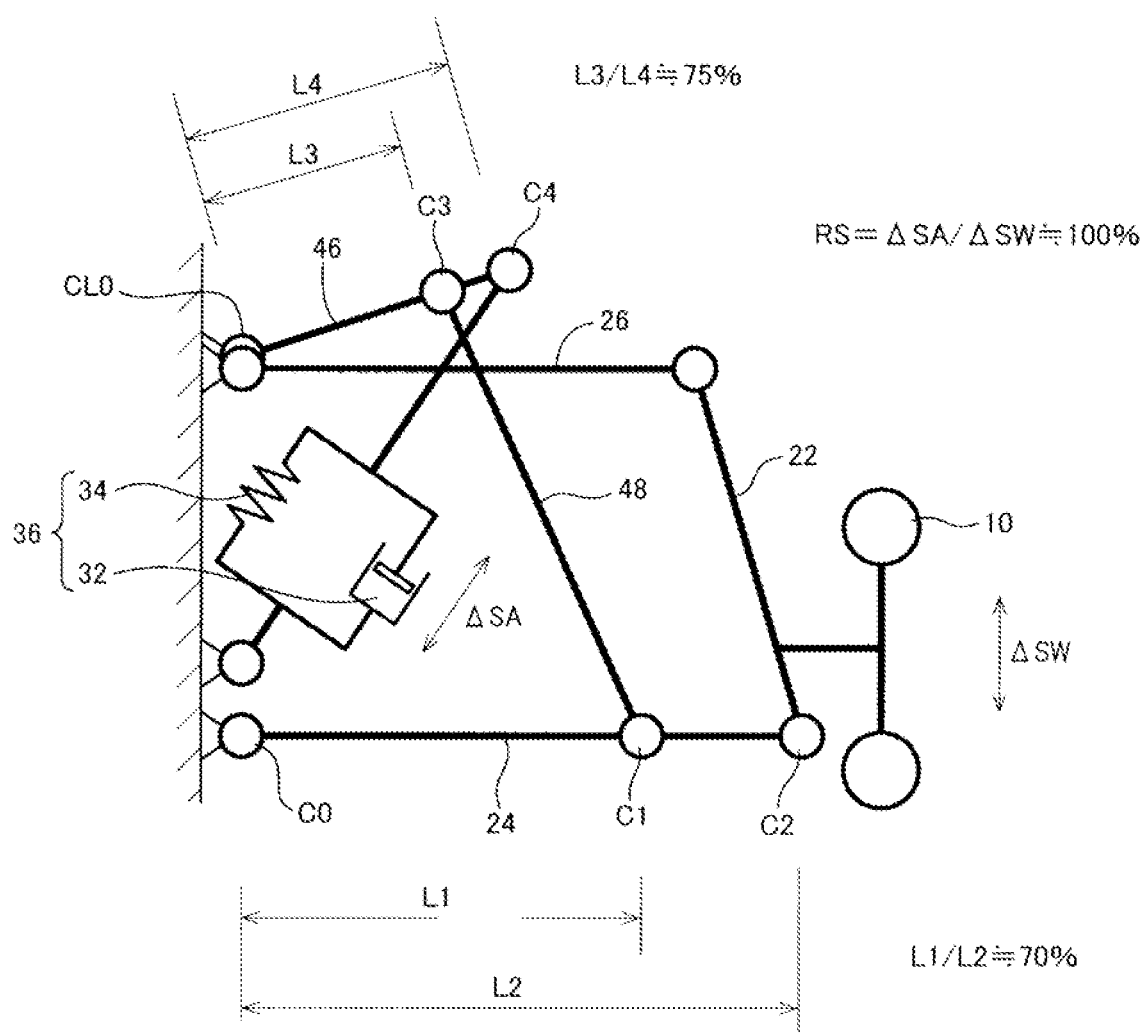
FIG. 5 is a view schematically illustrating a configuration of the suspension device according to the embodiment.

The suspension device explained above employs the rocking lever 46 and the link 48 and has a configuration schematically illustrated in FIG. 5. FIG. 5 is a view of the suspension device as seen from the front side of the vehicle and will be hereinafter referred to as "view seen from the vehicle front side" where appropriate. Referring also to FIG. 5, there will be explained a characteristic configuration of the present suspension device.

The suspension device of the present disclosure may be constructed such that the vertical positional relationship in the suspension device is inverted, for instance. Specifically, the rocking lever 46 may be supported at the lower end portion of the base plate 20, and the second end portion of the link 48 may be connected to the upper arm 26. In view of this, one of the lower arm 24 and the upper arm 26 to which the second end portion of the link 48 is connected is defined as a link-connected arm. In the suspension device of the present embodiment, the lower arm 24 is the link-connected arm. In the view seen from the vehicle front side, a position at which the lower arm 24 as the link-connected arm and the link 48 are connected is referred to as a first connection position C1, and a position at which the lower arm 24 is supported by the base plate 20 is referred to as a supporting position C0. Further, a distance between the first connection position C1 and the supporting position C0 is referred to as a first distance L1, a position at which the lower arm 24 and the unit 22 are connected is referred to as a second connection position C2, and a distance between the second connection position C2 and the supporting position C0 is referred to as a second distance L2. In the present suspension device, the first distance L1 is not smaller than 60% of the second distance L2. Specifically, the first distance L1 is about 70% of the second distance L2.

Figure 6:
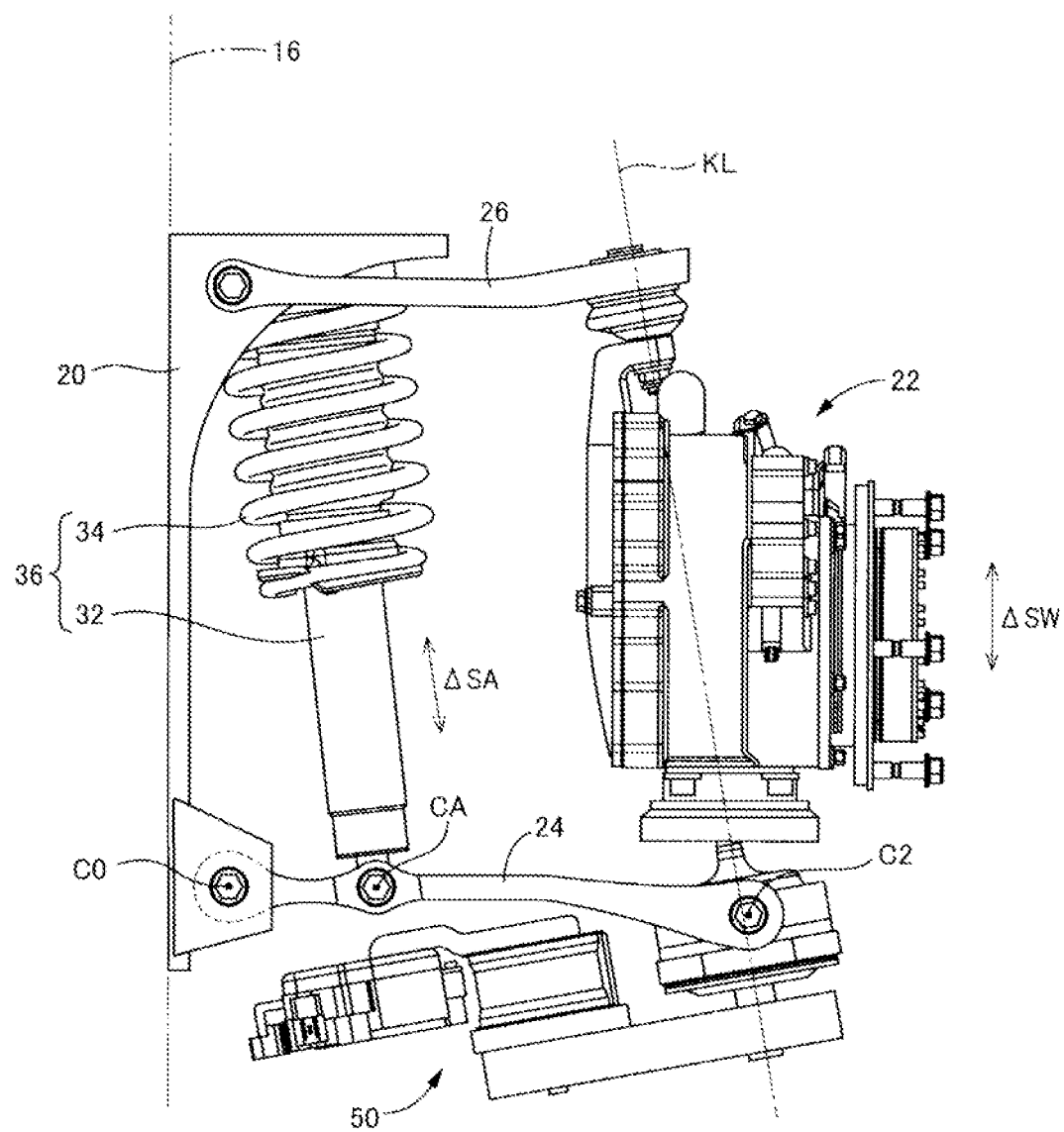
FIG. 6 is a view of a suspension device for a vehicle not equipped with the rocking lever and the link as viewed from a front side of the vehicle.

FIG. 6 illustrates an ordinary suspension device. In FIG. 6, the same reference numerals as used in the suspension device of the present embodiment are used to identify constituent elements that are the same as or similar to those in the suspension device of the present embodiment. In the suspension device of FIG. 6 not equipped with the rocking lever 46 and the link 48, a position at which the absorber 32 and the lower arm 24 are connected is referred to as an absorber connection position CA, and a distance between the absorber connection position CA and the supporting position C0 is referred to as an absorber distance LA. In the ordinary suspension device shown in FIG. 6, the absorber distance LA is about 20% of the second distance L2. Each of the absorber 32 and the SA/Assy 36 has a certain dimension in the diametric direction. In the ordinary suspension device of FIG. 6, therefore, it is impossible to bring the absorber connection position CA close to the second connection position C2 to such an extent that the first connection position C1 in the present suspension device of FIG. 1 is close to the second connection position C2. Accordingly, the absorber distance LA is about 50% of the second distance L2 at most. In particular where wheel 10 is the steerable wheel and the unit 22 functions as the steering knuckle, it is more difficult to bring the absorber connection position CA close to the second connection position C2. In the ordinary suspension device of FIG. 6, a stroke ratio RS, which is a ratio of a stroke amount $\Delta SA$ of the shock absorber (i.e., an amount of expansion and contraction of the shock absorber) with respect to a stroke amount $\Delta SW$ of the wheel (i.e., an amount of a relative upward and downward movement of the wheel and the vehicle body), is only about 50%. Thus, the efficiency of the shock absorber is inevitably low in the ordinary suspension device. In other words, in the case where a damping force is generated with respect to a certain stroke movement (the relative upward and downward movement of the wheel 10 and the vehicle body 16), the shock absorber needs to generate a relatively large force, resulting in an increase in the size of the shock absorber, i.e., an increase in the diameter of the shock absorber.

In the present suspension device, in contrast, the first distance L1 can be made relatively large with respect to the second distance L2, and the stroke ratio RS can be made relatively large, thus enabling the efficiency of the shock absorber to be relatively high. Consequently, the shock absorber can be downsized, namely, the diameter of the shock absorber can be reduced.

In the present suspension device, when seen from the front side of the vehicle, a second end portion (as the other end portion) of the absorber 32 is connected to the rocking lever 46 at the position farther from the first end portion of the rocking lever 46 than the position at which the first end portion of the link 48 is connected to the rocking lever 46. In this respect, as shown in FIGS. 1 and 5, the position at which the rocking lever 46 is supported by the base plate 20 is referred to as a lever supporting position CL0, the position at which the link 48 is connected to the rocking lever 46 is referred to as a third connection position C3, a distance between the third connection position C3 and the lever supporting position CL0 is referred to as a third distance L3, a position at which the distal portion of the absorber 32 is connected to the rocking lever 46 is referred to as a fourth connection position C4, and a distance between the fourth connection position C4 and the lever supporting position CL0 is referred to as a fourth distance L4. In the present suspension device, the third distance L3 is made smaller than the fourth distance L4. Specifically, the third distance L3 is about 75% of the fourth distance L4. Accordingly, the stroke ratio RS is close to 100%.

C. SUPPORTING STRUCTURE FOR SUPPORTING SUSPENSION SPRING BY SHOCK ABSORBER

Here, a range of the stroke movement is defined as a stroke range. In the ordinary suspension device of FIG. 6, the spring 34 is receiving a compressive load over the entirety of the stroke range. In other words, a part of the weight of the vehicle body 16 that should be borne by the ordinary suspension device is supported by a reaction force generated by compression of the spring 34, i.e., an elastic compressive reaction force of the spring 34.

In contrast, a part of the weight of the vehicle body 16 that should be borne by the present suspension device is supported by a reaction force generated by tension of the spring 34, i.e., an elastic tensile reaction force of the spring 34. Specifically, the length of the spring 34 in a full rebound state shown in FIG. 2B (i.e., a state in which the wheel 10 is moved downward relative to the vehicle body 16 and located at the lowermost position in the stroke range) is smaller than the length of the spring 34 in a full bound state shown in FIG. 2A (i.e., a state in which the wheel 10 is moved upward relative to the vehicle body 16 and located at the uppermost position in the stroke range). Thus, unlike the ordinary suspension device, the present suspension device is configured such that the first-end supporting structure 40 for supporting the first end portion of the spring 34 and the second-end supporting structure 42 for supporting the second end portion of the spring 34 are specially designed. It is noted that, in the present suspension device, the spring 34 is receiving a tensile load in all of the full bound state, the full rebound state, and an intermediate state between the full bound state and the full rebound state.

Figure 7A:
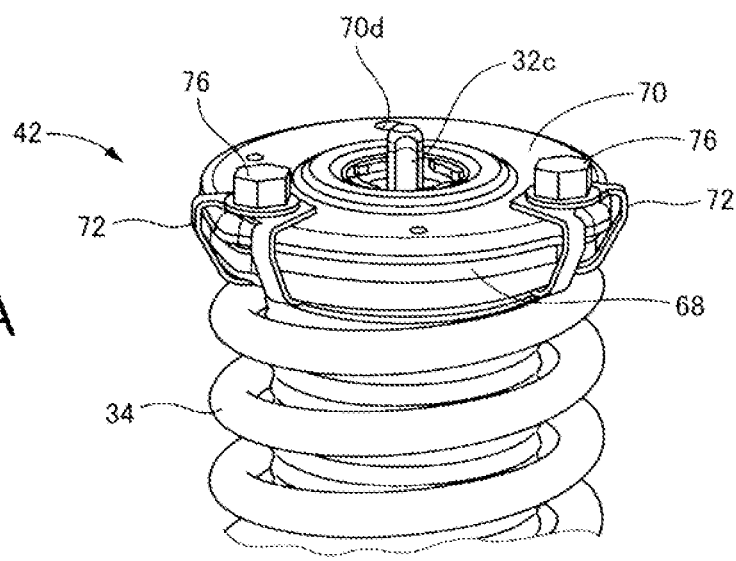
FIG. 7A is a perspective view for explaining a supporting structure for supporting a suspension spring at a second end portion thereof by the shock absorber in the suspension device according to the embodiment.
Figure 7B:
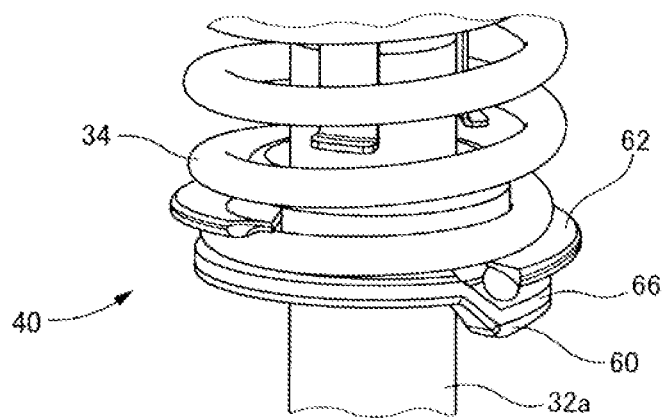
FIG. 7B is a perspective view for explaining a supporting structure for supporting the suspension spring at a first end portion thereof by the shock absorber in the suspension device according to the embodiment.

Referring also to FIGS. 7A and 7B, the first-end supporting structure 40 (as the one-end supporting structure) and the second-end supporting structure 42 (as the other-end supporting structure) will be explained. As illustrated in FIG. 7B and FIG. 3B, the first-end supporting structure 40 includes a lower-end spring seat 60 with which a lower end (tip) of the spring 34 is held in contact and a nipping ring 62 as a nipping member that cooperates with the lower-end spring seat 60 to nip a lower end portion of the spring 34. In this respect, the "lower end (tip)" of the spring 34 is exactly an end of the spring 34 at which the spring 34 is held in contact with the lower-end spring seat 60, and the "lower end portion" of the spring 34 is a portion of the spring 34 including the lower end (tip) and its vicinity. The lower-end spring seat 60 is a flanged annular member including a seat surface 60a that inclines along the lower end (tip) of the spring 34. The nipping ring 62 is a flanged annular member including a nipping (contact) surface 62a that inclines along inclination of the wire of the lower end portion of the spring 34. As illustrated in FIG. 3B, an external thread 64 is formed on an outer circumferential portion of the housing 32a of the absorber 32, and internal threads 60b, 62b that are threadedly engaged with the external thread 64 are formed on the lower-end spring seat 60 and the nipping ring 62, respectively. The lower-end spring seat 60 and the nipping ring 62 can nip the lower end portion of the spring 34 utilizing the external thread 64 and the internal threads 60b, 62b while permitting easy adjustment of the position of the lower end portion of the spring 34 in the up-down direction. A rubber ring 66 as a cushioning member is interposed between the lower end of the spring 34 and the lower-end spring seat 60.

As illustrated in FIG. 7A and FIG. 3A, the second-end supporting structure 42 includes an upper-end spring seat 70 with which an upper end (tip) of the spring 34 is held in contact via a rubber ring 68 as a cushioning member and two hooks 72, each as a nipping member, that cooperate with the upper-end spring seat 70 to nip an upper end portion of the spring 34 therebetween. In this respect, the "upper end (tip)" of the spring 34 is exactly an end of the spring 34 at which the spring 34 is held in contact with the upper-end spring seat 70, and the "upper end portion" of the spring 34 is a portion of the spring 34 including the upper end (tip) and its vicinity. The upper-end spring seat 70 is formed by bonding a generally disc-like first plate 70a and a generally hat-like second plate 70b. A generally disc-like support plate 74 fixed to the distal portion of the piston rod 32c of the absorber 32 is supported between the first plate 70a and the second plate 70b with a cushioning rubber 70c interposed therebetween. The two hooks 72 are fastened respectively by bolts 76 into respective two internally threaded holes 70d formed on the upper-end spring seat 70 at an angular pitch of 120°. Specifically, in consideration of the shape of the upper end portion of the spring 34, one of the two hooks 72 retains the upper end portion of the spring 34 at a position at and near a winding end part of the wire, and the other of the two hooks 72 retains the upper end portion of the spring 34 at a position apart from the position indicated above by 240° along the wound wire. Each of the two hooks 72 clamps, utilizing its own elastic reaction force, the second end portion of the spring 34 with respect to the upper-end spring seat 70 through the rubber ring 68. For easy understanding, the position of each bolt 76 and the corresponding threaded hole 70d is shifted in the circumferential direction in FIG. 3B relative to the position of the corresponding hook 72.

Owing to the first-end supporting structure 40 and the second-end supporting structure 42 explained above, the suspension device is configured such that the first end portion of the spring 34 is capable of being supported by the housing 32a of the absorber 32 and the second end portion of the spring 34 is capable of being supported by the distal portion of the piston rod 32c of the absorber 32 while the spring 34 is receiving a tensile load. Thus, the employment of the SA/Assy 36 including the first-end supporting structure 40 and the second-end supporting structure 42 enables the present suspension device to be constructed as a suspension device of coil spring tension support type having high utility.

Here, each of the lower-end spring seat 60 and the upper-end spring seat 70 is defined as a spring seat with which the end (tip) of the spring 34 is held in contact. Each of the nipping ring 62 and the hook 72 is defined as a nipping member that cooperates with the spring seat to nip the end (tip) of the spring 34 therebetween. Each of the housing 32a of the absorber 32 and the distal portion of the piston rod 32c by which the end (tip) of the spring 34 is supported is defined as a support portion of the absorber. According to the definitions, the first-end supporting structure 40 is referred to as a structure in which the nipping member is supported directly by the support portion of the absorber. (This structure will be hereinafter referred to as "direct support structure" where appropriate). On the other hand, the second-end supporting structure 42 is referred to as a structure in which the nipping member is supported by the spring seat so that the nipping member is supported indirectly by the support portion of the absorber. (This structure will be hereinafter referred to as "indirect support structure" where appropriate). In the indirect support structure, the elastic tensile reaction force of the suspension spring acts on the spring seat. In the direct support structure, the elastic tensile reaction force of the suspension spring does not act on the spring seat.

D. MODIFICATIONS

In the suspension device of the illustrated embodiment, the structure for supporting the first end portion of the suspension spring is the direct support structure. The structure for supporting the first end portion of the suspension spring may be the indirect support structure. In the suspension device of the illustrated embodiment, the structure for supporting the second end portion of the suspension spring is the indirect support structure. The structure for supporting the second end portion of the suspension spring may be the direct support structure.

In the suspension device of the illustrated embodiment, the absorber 32 is disposed such that the piston rod 32c extends upward from the housing 32a. The present disclosure may be applicable to a suspension device including the absorber configured such that the piston rod extends downward from the housing, i.e., a suspension device in which the absorber illustrated in FIG. 3B is disposed upside down.

In the suspension device of the illustrated embodiment, the spring 34 is receiving the tensile load in all of the full bound state, the full rebound state, and the intermediate state between the full bound state and the full rebound state. In other words, the spring 34 is receiving the tensile load over the entirety of the stroke range. The present disclosure may be applicable to a suspension device in which the suspension spring is receiving the tensile load in at least one of the full bound state and the full rebound state. In other words, the present disclosure may be applicable to a suspension device in which the suspension spring is receiving a compressive load in any one of the full bound state and the full rebound state.

The suspension device of the illustrated embodiment is configured such that the link 48 is connected to the lower arm 24. The suspension device according to the present disclosure may be configured such that the link is connected to the upper arm. In short, the suspension device according to the present disclosure may be configured such that the vertical positional relationship of the constituent elements is inverted, namely, such that the constituent elements of the suspension device of FIG. 1 are disposed upside down.

What is claimed is:

1. A suspension device for a vehicle, comprising a spring-absorber unit constituted by a shock absorber and a suspension spring that are formed as one unit, the shock absorber including a cylindrical housing, a piston disposed in the housing, and a piston rod that is connected at a basal portion thereof to the piston and that extends from the housing, the suspension spring being a coil spring through which the shock absorber passes, wherein one end portion of the suspension spring is capable of being supported by the housing of the shock absorber, and the other end portion of the suspension spring is capable of being supported by a distal portion of the piston rod of the shock absorber while the suspension spring is receiving a tensile load, and wherein the suspension spring extends in a bound state and contracts in a rebound state.

2. The suspension device according to claim 1, wherein the suspension spring is receiving the tensile load in at least one of a full bound state and a full rebound state.

3. The suspension spring according to claim 2, wherein the suspension spring is receiving the tensile load in all of the full bound state, the full rebound state, and an intermediate state between the full bound state and the full rebound state.

4. The suspension device according to claim 1, wherein one of the one end portion and the other end portion of the suspension spring is defined as a nip end portion, wherein a spring seat, with which a tip of the nip end portion of the suspension spring is held in contact, is provided for the nip end portion of the suspension spring so as to be disposed on the housing of the shock absorber or a distal portion of the piston rod, and wherein the suspension device comprises a nipping member that cooperates with the spring seat to nip the nip end portion of the suspension spring therebetween.

5. The suspension device according to claim 4, wherein the nipping member is supported by the spring seat.

6. The suspension device according to claim 4, wherein the nipping member is supported by the housing of the shock absorber or the distal portion of the piston rod.

7. The suspension device according to claim 1, comprising:

a carrier rotatably holding a wheel;

a lower arm and an upper arm each of which is pivotally supported at one end portion thereof by a body of the vehicle, the other end portion of each of the lower arm and the upper arm being connected to the carrier;

a rocking lever supported at one end portion thereof by the body of the vehicle so as to be rockable; and a link one end portion of which is connected to the rocking lever and the other end portion of which is connected to one of the lower arm and the upper arm at a position between the one end portion and the other end portion of the one of the lower arm and the upper arm, wherein the shock absorber is pivotally supported at the one end portion thereof by the body of the vehicle and is connected at the other end portion thereof to the rocking lever.

\* \* \* \* \*